(No Model.)
W. W. PORTER.
WIRE STRETCHER FOR CHECK ROWERS.
No. 292,679. Patented Jan. 29, 1884.
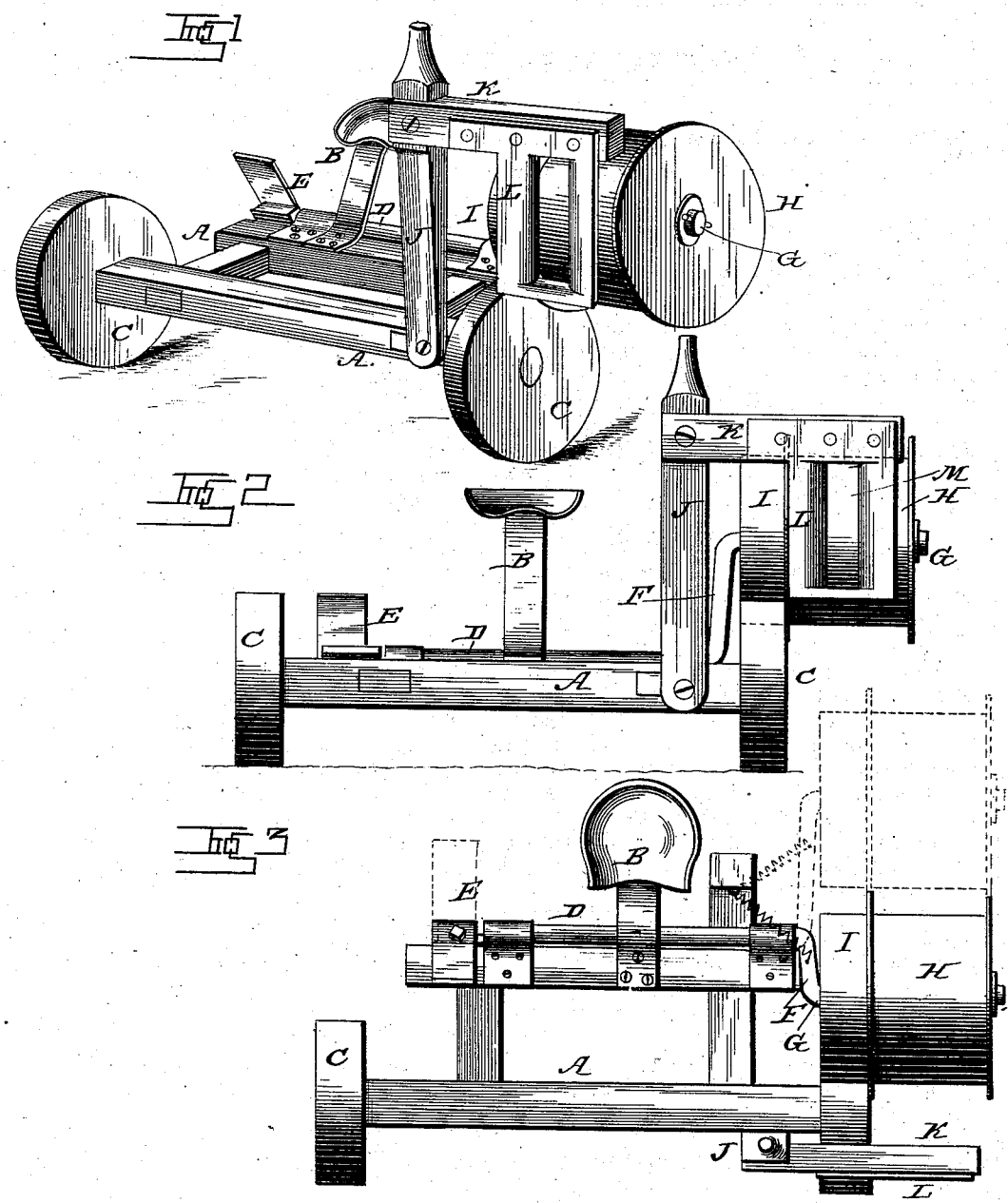
WITNESSES:
INVENTOR.
Wheelock W. Porter,
By Louis Bagger & Co.
ATTORNEYS.

UNITED STATES PATENT OFFICE.

WHEELOCK W. PORTER, OF KEMPTON, ILLINOIS.

WIRE-STRETCHER FOR CHECK-ROWERS.

SPECIFICATION forming part of Letters Patent No. 292,679, dated January 29, 1884.

Application filed September 4, 1883. (No model.)

*To all whom it may concern:*

Be it known that I, WHEELOCK W. PORTER, a citizen of the United States, and a resident of Kempton, in the county of Ford and State of Illinois, have invented certain new and useful Improvements in Wire-Stretchers for Check-Rowers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a portion of the frame and the wheels of a check-rower provided with my improved wire-winder. Fig. 2 is a front view, and Fig. 3 is a top view, of the same.

Similar letters of reference indicate corresponding parts in all the figures.

My invention has relation to attachments for check-row corn-planters, by which the check rope or wire may be wound upon a reel upon the planter-frame and again paid out over the field from the reel; and it consists in the improved construction and combination of parts of the same, as hereinafter more fully described and claimed.

In the accompanying drawings, the letter A indicates a portion of the planter-frame, upon which the driver's seat B is mounted, and which is mounted upon the wheels C C. Near the driver's seat is journaled a transverse shaft, D, having a treadle, E, projecting within reach of the driver's foot, by means of which the shaft may be rocked; and one end of the shaft is bent to form a crank, F, upon the straight horizontal portion G of which a reel, H, is journaled, the crank being bent in such a manner that when the treadle is tilted forward the crank is tilted forward in such a manner as to bring a narrow rim, I, upon the inner end of the reel in contact with the rim of the wheel, causing the reel to be revolved by the friction. The wire is wound upon this reel as the planter is propelled, and to guide the wire in such a manner that it is wound evenly upon the reel a lever, J, is pivoted at its lower end upon the planter-frame, its upper end forming a handle within easy reach of the driver, and rocking in a transverse plane to the reel, which lever is provided with a laterally-projecting arm, K, having a downwardly-projecting slotted plate, L, upon its outer end, the slot M in this plate having inwardly-beveled edges. By passing the wire through the slot in this guide-plate and rocking the lever slowly from one side to the other, the wire may be guided and wound in a regular coil upon the reel, and, when desired, by simply throwing the reel back from contact with the wheel the wire may be unwound from the same.

Having thus described my invention, I claim and desire to secure by Letters Patent of the United States—

The combination of a corn-planter frame mounted upon wheels, a transverse shaft journaled upon the said frame and having a treadle upon its straight portion and forming a crank at one end, a reel journaled upon the horizontal portion of said crank, and having a narrow friction-rim at its inner end, and a transversely-rocking hand-lever pivoted at its lower end upon the planter-frame, forming a handle at its upper end, and having a laterally-extending arm provided with a downwardly-projecting plate having a longitudinal slot with inwardly-beveled edges, all constructed to operate as and for the purpose shown and set forth.

In testimony that I claim the foregoing as my own I have hereunto affixed my signature in presence of two witnesses.

WHEELOCK W. PORTER.

Witnesses:
THOMAS W. CHANDLER,
JONATHAN E. SEYSTER.